Patented May 24, 1949

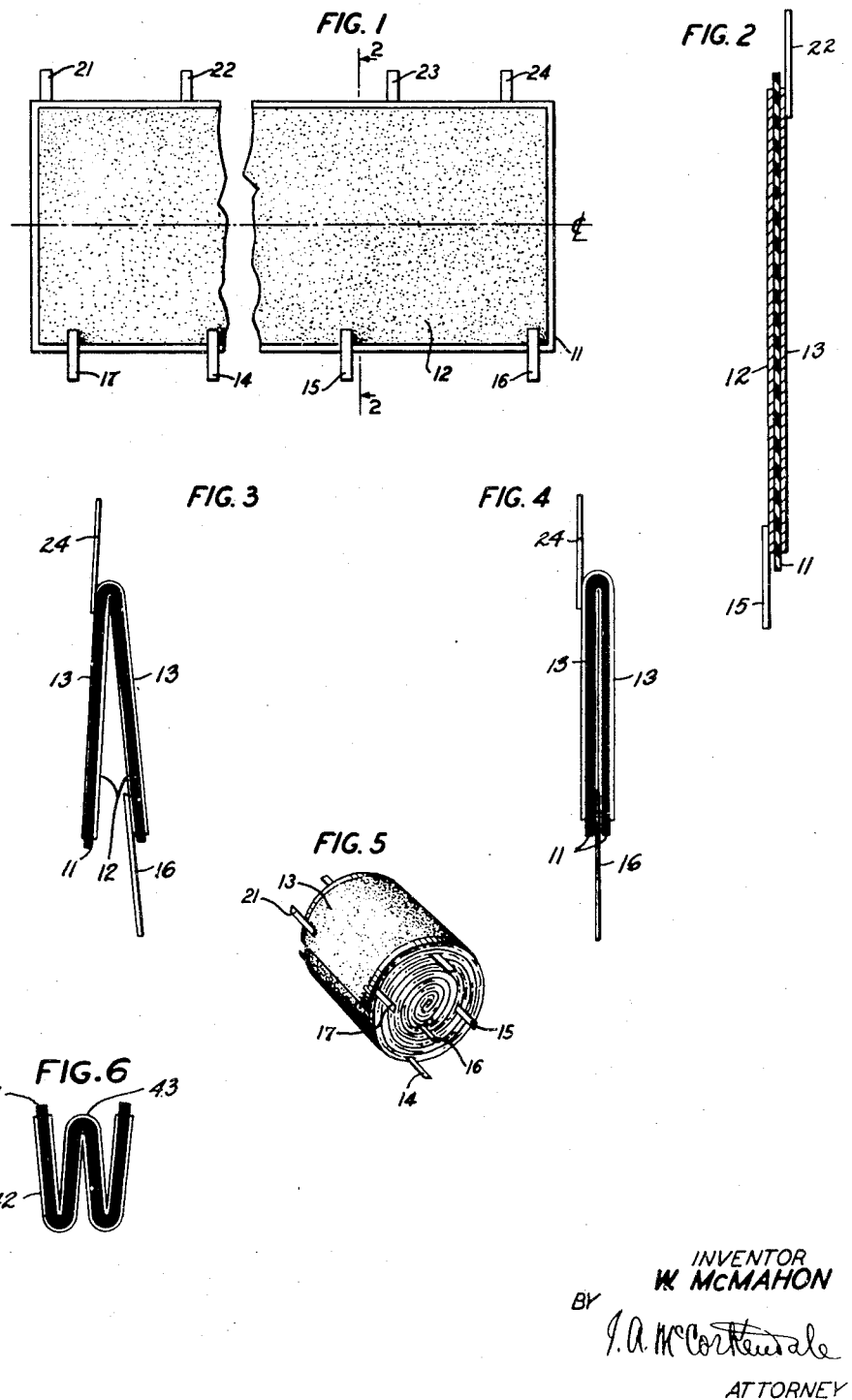

2,470,826

UNITED STATES PATENT OFFICE 2,470,826

FIXED CAPACITOR

William McMahon, Summit, N. J., assignor to Bell Telephone Laboratories, Incorporated, New York, N. Y., a corporation of New York Application November 6, 1947, Serial No. 784,326

5 Claims. (Cl. 175—41)

1

This invention relates to an electrical capacitor and more particularly to an electrical capacitor of the metallized type.

An object of the invention is to improve the operation of electrical capacitors and to simplify and render more economical the manufacture thereof.

Heretofore the conventional paper capacitor has ordinarily consisted basically of windings of two thin metallic foils, i. e. the electrodes, separated by a minimum of two plies of Kraft capacitor tissue. The multiple-ply dielectric is used so that there will be little chance of failure from metallic particles or weak spots in the tissue. The probability of coincidence of weak spots in two papers is considered to be very slight.

In a new type of capacitor recently introduced commercially no foil is used. Instead, the capacitor electrodes are in the form of thin metallic coatings deposited directly on the paper or other dielectric; this type of capacitor is commonly termed a metallized capacitor. This type of capacitor is described, for example, in an article "Metallized paper capacitors" by Mr. James I. Cornell published in "Communications," January 1947, page 22. As set forth in the article referred to, this general type of capacitor offers several desirable features among which is the very important one that it is self-healing.

In accordance with a specific embodiment of the present invention the capacitor comprises a dielectric in the form of a thin flexible sheet of paper, or other suitable material, with individual electrode coatings of metal applied to both sides thereof by metallization. After metallization, the sheet is rolled to form the necessary compact structure for potting or casing.

It will be obvious, of course, that in the construction of this type of capacitor some means must be provided for maintaining electrical separation of the two electrode coatings when the metallized dielectric is rolled. Several methods have been proposed heretofore, one being the provision of suitable insulating sheets to separate the two electrodes.

In accordance with a feature of the present invention, the dielectric sheet, after metallization on both sides and before rolling, is folded once along its center line. Introduction of this novel step in the preparation of the capacitor permits the coated sheet to then be rolled in the conventional manner without possibility of electrical contact between the two individual electrode coatings. It becomes feasible therefore by virtue of features taught by the present invention to utilize a single sheet dielectric coated on both sides and rolled in the conventional manner without the necessity of providing any additional insulating sheets or other separator members.

Full understanding of the arrangement contemplated by the present invention and appreciation of the various desirable features thereof will be gained from consideration of the following detailed description and the annexed drawings in which:

Fig. 1 is a plan view of the dielectric sheet, the metallized coating applied on one face thereof being shown;

Fig. 2 is an end sectional view taken on line 2—2 of Fig. 1 showing the metallized coating on both faces of the dielectric sheet;

Fig. 3 is an end view showing the metallized dielectric sheet in the process of being folded along the center line thereof in accordance with one embodiment of the invention;

Fig. 4 is an end view showing the same metallized sheet upon the completion of the single folding step in accordance with said one embodiment;

Fig. 5 shows the metallized sheet rolled and ready for potting or encasing after first having been folded as shown in Figs. 3 and 4; and Fig. 6 is an end view showing a metallized dielectric sheet in the process of being folded a plurality of times in accordance with a modification of the embodiment previously referred to.

Referring now to the drawings and, first, to Figs. 1 and 2, the single flexible dielectric sheet 11, of paper or other suitable material, is provided with metallized electrode coatings 12 and 13 on the front and rear major surfaces respectively. As indicated a small uncoated margin is provided around the edges of each of the faces of the sheet.

The metallized coatings of suitable metal, for example zinc, aluminum, cadmium or other metals, are applied by a suitable metallization process. For example, they may be applied by a process of thermal evaporation in an evacuated chamber or by thermal evaporation at atmospheric pressure in accordance with the process and apparatus disclosed in the copending application Serial No. 745,601, filed May 2, 1947, "Coating objects," H. G. Wehe.

Suitable means are provided whereby circuit connections may be made to each electrode coating. In the embodiment illustrated, a number of terminal tabs, as 14, 15, 16, 17, are provided, which engage electrode 12 and a number of similar terminal tabs, as 21, 22, 23, 24, are provided which engage electrode coating 13. The several terminal tabs of each set may then be interconnected for connection respectively to the two external terminals of the capacitor. If desired, the terminal tabs may be inserted as the coated sheet is being rolled.

Other methods whereby to effectively connect the external terminals to a multiplicity of points on each electrode coating may be followed, for example metal end coatings may be applied after rolling by a suitable method, for example, by the Schoop process. It will be also understood, of course, that the external terminals may, if desired, be connected directly to the respective coatings at a single point only.

In accordance with the features of the present invention, and as shown in Figs. 3 and 4, dielectric sheet 11, after application of metallized coatings 12 and 13, is folded once along its center line whereby to attain the structure of Fig. 4. It will be apparent that with this novel arrangement, electrical contact between electrode coatings 12 and 13 is effectively prevented regardless of how the structure is rolled or folded.

As illustrated in Fig. 5, the coated sheet, after folding as described, is rolled in the conventional manner whereby to form a compact cylindrical structure preparatory to potting or encasing. Each set of terminal tabs may then be interconnected for connection to the respective two external terminals of the capacitor.

It will be apparent from the above description that a simple and efficient capacitor structure has been attained; the novel step of folding the dielectric sheet once along the center line after metallization on both sides permits conventional rolling without the necessity of separator sheets or other insulating means. The simplest possible structure is thereby attained and full advantage is taken of the provision of a single sheet dielectric with metallized coatings on both sides thereof.

Under certain circumstances it may be found desirable to fold the coated dielectric an additional number of times after the initial folding along the center line and it is contemplated by a modification of the embodiment of the invention described above that the sheet may be folded any odd number of times (within the practical manufacturing limits of course) before rolling. For example, there is illustrated in Fig. 6 dielectric sheet 41, which is provided with metallized coatings 42 and 43 on the respective major surfaces thereof, in the process of being folded three times, i. e. first along the center line as in the embodiment previously described and, second, along the respective center lines of the two resulting halves. The resulting W-shaped structure is then flattened as in the previous case (Fig. 4) and rolled or otherwise prepared for potting or encasing. Terminals are provided in the desired manner.

In the same general manner just described, the metallized sheet may be folded 5 times; 7 times; or any other odd number of times. The resulting structure may be described as "accordion pleated."

Methods, other than rolling, may of course be followed preparatory to potting or encasing; for example the sheet may be folded in various ways to compact the structure i. e. after folding in the manner described above.

While specific embodiments of the invention have been selected for detailed description, the invention is not limited in its application to such embodiments. The embodiments described should be taken as illustrative of the invention and not as restrictive thereof.

What is claimed is:

1. A fixed capacity electrical capacitor comprising a rolled dielectric sheet having a metallized coating on each face thereof, and terminals in electrical contact with each coating, said sheet being folded once along its center line after metallization and before rolling.

2. An electrical capacitor of the rolled type comprising a single, flexible dielectric sheet, a metallized electrode coating on each of the two major surfaces of said sheet, and an external terminal connected to each of said coatings, said sheet being folded once along its center line after metallization and before rolling.

3. An electrical capacitor of the rolled type comprising a single, flexible dielectric sheet, a metallized electrode coating on each of the two major surfaces of said sheet, two external terminals, and means for directly connecting each of said terminals to a plurality of points on said respective coatings, said sheet being folded once along its center line after metallization and before rolling.

4. An electrical capacitor of the rolled type comprising a single flexible dielectric sheet, a metallized electrode coating on each of the two major surfaces of said sheet, and an external terminal connected to each of said coatings, said sheet being folded lengthwise three times once along its center line and once along the respective center lines of the resulting half sections, whereby to produce a W-shaped structure, after metallization and before rolling.

5. A fixed capacity electrical capacitor comprising a rolled dielectric sheet having a metallized electrode coating on each major surface thereof, and external terminals in electrical contact with each coating, said sheet after metallization and before rolling being folded lengthwise $n$ times whereby to produce an accordion-pleated structure of $n+1$ folds of equal width, where $n$ is any odd number.

WILLIAM McMAHON.

No references cited.